US012739175B2

(12) United States Patent
Lee et al.

(10) Patent No.: US 12,739,175 B2
(45) Date of Patent: Sep. 15, 2026

(54) ELECTRONIC DEVICE FOR MANAGING NETWORK DEVICE USING DIGITAL TWIN AND METHOD FOR OPERATING THE SAME

(71) Applicant: ELECTRONICS AND TELECOMMUNICATIONS RESEARCH INSTITUTE, Daejeon (KR)

(72) Inventors: Hyun Jeong Lee, Daejeon (KR); Changkyu Lee, Daejeon (KR); Shin Gak Kang, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 97 days.

(21) Appl. No.: 18/934,873

(22) Filed: Nov. 1, 2024

(65) Prior Publication Data

US 2025/0150354 A1 May 8, 2025

(30) Foreign Application Priority Data

Nov. 3, 2023 (KR) ........................ 10-2023-0151084
Oct. 30, 2024 (KR) ........................ 10-2024-0151099

(51) Int. Cl.
*G06F 13/00* (2006.01)
*H04L 41/14* (2022.01)
(Continued)

(52) U.S. Cl.
CPC ............ *H04L 41/145* (2013.01); *H04L 45/22* (2013.01); *H04L 47/125* (2013.01); *H04L 47/127* (2013.01)

(58) Field of Classification Search
CPC ..... H04L 41/145; H04L 45/22; H04L 47/125; H04L 47/127; H04L 41/147; H04L 41/16; H04L 43/0876
(Continued)

(56) References Cited

U.S. PATENT DOCUMENTS 11,928,103 B2 * 3/2024 Lee ......................... G06F 30/15
12,009,991 B1 * 6/2024 Furlong ................ H04L 41/145
(Continued)

FOREIGN PATENT DOCUMENTS

KR 1020170101287 A 9/2017
KR 1020220071880 A 5/2022
(Continued)

OTHER PUBLICATIONS

"Proposal for updating evaluation methods and references of ITU-T Y.DTN-CapLevel: Digital Twin Network—Capability Level and Evaluation Methods", ITU, Q23-13-July2023-C6, Study Group 13, Jul. 13, 2023, pp. 1-15.
(Continued)

*Primary Examiner* — Kenneth R Coulter
(74) *Attorney, Agent, or Firm* — Rabin & Berdo, P.C.

(57) ABSTRACT

An electronic device for managing a network device by using a digital twin and an operating method thereof are provided. The electronic device includes a processor and a memory configured to store instructions, wherein the instructions, when executed by the processor, cause the electronic device to obtain traffic information of a network device, generate digital twins respectively corresponding to the network device and the traffic information, synchronize current traffic information of the network device with the digital twins corresponding to the traffic information, and
(Continued)

train a model that is configured to predict an abnormal situation of the network device, based on the synchronized digital twins.

20 Claims, 8 Drawing Sheets

(51) Int. Cl.
*H04L 45/00* (2022.01)
*H04L 47/125* (2022.01)
*H04L 47/127* (2022.01)

(58) Field of Classification Search
USPC ......................... 709/223, 224, 248, 217–219
See application file for complete search history.

(56) References Cited

U.S. PATENT DOCUMENTS 12,045,238 B2 * 7/2024 Lee ..................... G06F 16/2455
12,373,702 B2 * 7/2025 Dechene ................ G06N 3/006
12,417,136 B2 * 9/2025 Cooper ............... G06F 12/0891
12,418,773 B2 * 9/2025 Smith ................... H04W 24/02
2022/0058182 A1 2/2022 Lee et al.
2022/0191648 A1 6/2022 Smith et al.
2022/0245462 A1 8/2022 Dechene et al.
2023/0010177 A1 * 1/2023 Lee ..................... G06F 16/2455
2023/0177523 A1 * 6/2023 Lee ........................ G06Q 40/04
705/317
2024/0193327 A1 * 6/2024 Albero .................... G06F 30/27
2024/0330532 A1 * 10/2024 Furlong .............. G06F 11/3419
2024/0338575 A1 * 10/2024 Lee ........................ G06N 3/098
2025/0131153 A1 * 4/2025 Lee ......................... G06F 30/20
2025/0181432 A1 * 6/2025 Cooper ................... H04L 69/18

FOREIGN PATENT DOCUMENTS

KR 10-2023-0008599 A 1/2023
KR 10-2024-0067604 A 5/2024

OTHER PUBLICATIONS

Hyeju Shin, et al. "Network Traffic Prediction Model in a Data-Driven Digital Twin Network Architecture", https: //web.archive.org/web/20231012191929/https: the invention (Oct. 12, 2023).

* cited by examiner

ELECTRONIC DEVICE FOR MANAGING NETWORK DEVICE USING DIGITAL TWIN AND METHOD FOR OPERATING THE SAME

BACKGROUND

1. Field of the Invention

One or more embodiments relate to an electronic device for managing a network device by using a digital twin and an operating method thereof.

2. Description of the Related Art

A digital twin is technology that generates a twin of a real-world object on a computer and simulates situations that may occur in the real world on a computer to predict the results in advance. Digital twins are attracting attention as technology that can solve various industrial/social problems as well as manufacturing problems.

A digital twin is essentially a combination of data and information that represents the structure, context, and behavior of various physical systems, and can be referred to as an interface that can understand past and present operational statuses and predict the future. The digital twin is a powerful digital entity that can be used to optimize a physical world, and may improve operational performance and a business process.

SUMMARY

Embodiments provide an electronic device configured to build a digital twin of network-related data such as network resources and traffic and to train a prediction model based on the digital twin.

Embodiments provide an electronic device configured to build a digital twin of a network device, a place in which a network device is installed, and a network condition to predict a network traffic trend, distribute traffic, and monitor the place in which the network device is installed.

Embodiments provide an electronic device configured to predict, using a trained model, an abnormal situation of a network device and provide a countermeasure for the abnormal situation.

Embodiments provide an artificial intelligence (AI)-based digital twin network management method by visualizing and managing, using a prediction model, data according to current traffic.

Other objects and advantages of the present disclosure can be understood by the following description and will become more apparent by the embodiments of the present disclosure. In addition, it will be apparent that the objects and advantages of the present disclosure can be readily realized by the means and combinations thereof recited in the claims.

According to an aspect, there is provided an electronic device including a processor and a memory configured to store instructions, wherein the instructions, when executed by the processor, cause the electronic device to obtain traffic information of a network device, generate digital twins respectively corresponding to the network device and the traffic information, synchronize current traffic information of the network device with the digital twins corresponding to the traffic information, and train a model that is configured to predict an abnormal situation of the network device, based on the synchronized digital twins.

When executed by the processor, the instructions may cause the electronic device to obtain spatial information of a place in which the network device is located, generate a digital twin corresponding to the spatial information, synchronize current spatial information with the digital twin corresponding to the spatial information, and train the model by further utilizing the synchronized spatial information.

When executed by the processor, the instructions may cause the electronic device to train the model based on a past traffic pattern and an abnormal situation occurrence pattern of the network device.

The spatial information may include environment information of the place in which the network device is located.

The traffic information may include at least one of operation information, operation policy information, and external media information of the network device.

According to an aspect, there is provided an electronic device including a processor and a memory configured to store instructions, wherein the instructions, when executed by the processor, cause the electronic device to obtain current traffic information of a network device, predict an abnormal situation of the network device from the current traffic information, through a model based on digital twins respectively corresponding to the network device and traffic information of the network device, and when the abnormal situation is predicted to occur, determine a countermeasure for the abnormal situation.

When executed by the processor, the instructions may cause the electronic device to predict future traffic of the network device through the model and determine whether the future traffic exceeds a predetermined threshold.

When executed by the processor, the instructions may cause the electronic device to, when the future traffic exceeds the predetermined threshold, generate a bypass channel for a bandwidth of high-priority traffic and distribute the high-priority traffic to the bypass channel.

When executed by the processor, the instruction may cause the electronic device to predict, using the model, whether a disaster situation is to occur at a place in which the network device is located.

When executed by the processor, the instruction may cause the electronic device to, when the disaster situation is predicted to occur at the place in which the network device is located, generate a bypass channel for a bandwidth of high-priority traffic in the network device and distribute the high-priority traffic to the bypass channel.

When executed by the processor, the instruction may cause the electronic device to, when the disaster situation is predicted to occur at the place in which the network device is located, output an evacuation notification to people that are at the place and/or a relocation notification of the network device.

When executed by the processor, the instruction may cause the electronic device to output a network status change of the network device that is predicted by the model.

According to an aspect, there is provided an operating method of an electronic device, including obtaining current traffic information of a network device, predicting an abnormal situation of the network device from the current traffic information, through a model based on digital twins respectively corresponding to the network device and traffic information of the network device, and when the abnormal situation is predicted to occur, determining a countermeasure for the abnormal situation.

The predicting of an abnormal situation of the network device may include predicting future traffic of the network device through the model and determining whether the future traffic exceeds a predetermined threshold.

The determining of a countermeasure for the abnormal situation may include, when the future traffic exceeds the predetermined threshold, generating a bypass channel for a bandwidth of high-priority traffic and distributing the high-priority traffic to the bypass channel.

The predicting of an abnormal situation of the network device may include predicting, using the model, whether a disaster situation is to occur at a place in which the network device is located.

The determining of a countermeasure for the abnormal situation may include, when the disaster situation is predicted to occur at the place in which the network device is located, generating a bypass channel for a bandwidth of high-priority traffic in the network device and distributing the high-priority traffic to the bypass channel.

The determining of a countermeasure for the abnormal situation may include, when the disaster situation is predicted to occur at the place in which the network device is located, outputting an evacuation notification to people that are at the place and/or a relocation notification of the network device.

The predicting of an abnormal situation of the network device may include outputting a network status change of the network device that is predicted by the model.

Additional aspects of embodiments will be set forth in part in the description which follows and, in part, will be apparent from the description, or may be learned by practice of the disclosure.

According to embodiments, an electronic device may distribute traffic and efficiently manage a network by visualizing and managing, using a prediction model, data according to real-time traffic of a network device.

According to embodiments, an electronic device may, using an artificial intelligence (AI)-based digital twin network management method, prevent a network-related abnormal situation from occurring and provide a countermeasure when an abnormal situation occurs to enable a rapid response.

According to embodiments, an electronic device may prevent service interruption to a network device and reduce cost loss by ensuring an advance or immediate response to an abnormal situation of the network device and a disaster situation such as fire and flood in a place in which the network device is installed.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
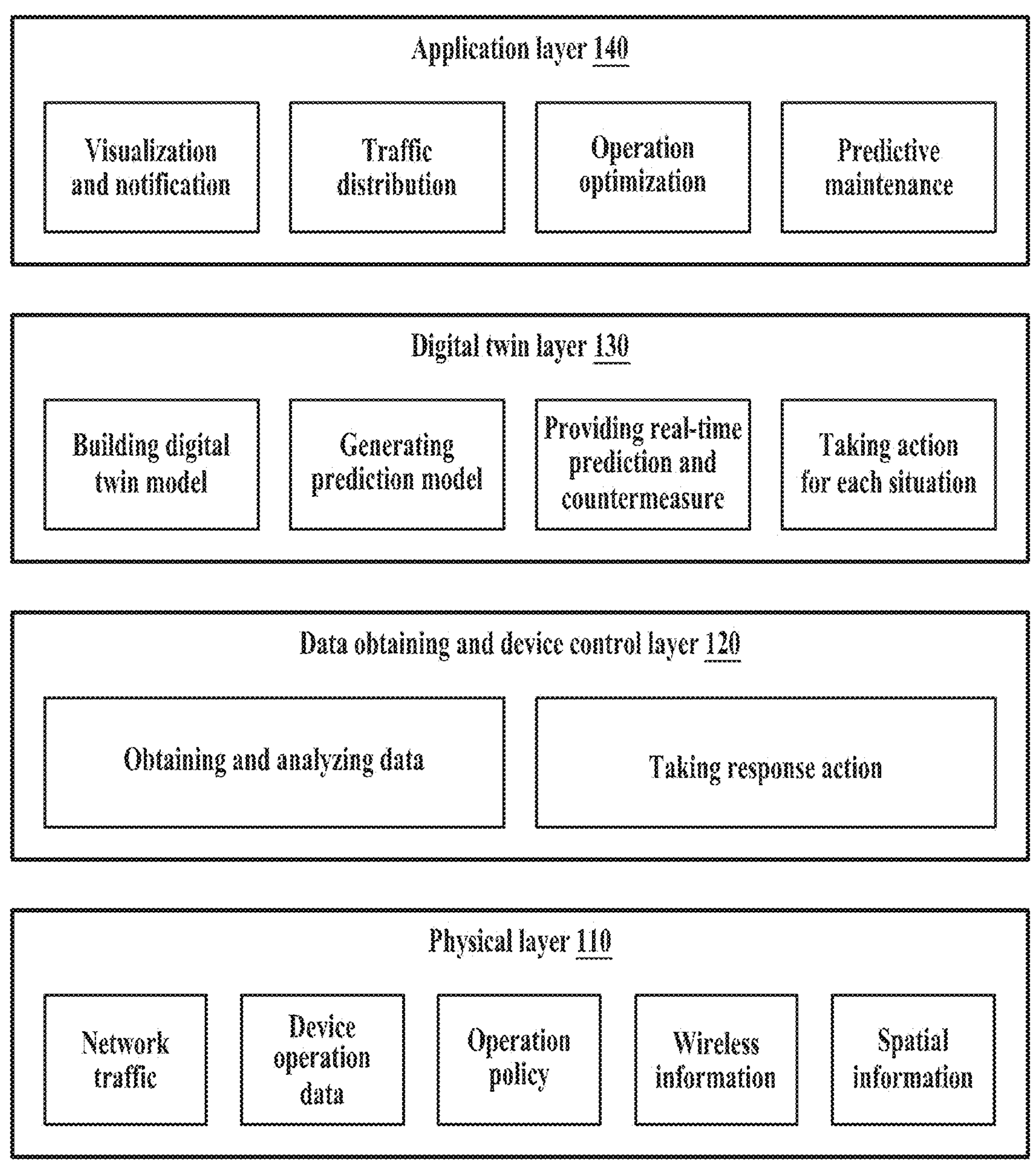
FIG. 1 is a diagram illustrating a structure of an electronic device according to an embodiment.

The following structural or functional description of examples is provided as an example only and various alterations and modifications may be made to the examples. Thus, an actual form of implementation is not construed as limited to the examples described herein and should be understood to include all changes, equivalents, and replacements within the idea and the technical scope of the disclosure.

As used herein, each of "A or B," "at least one of A and B," "at least one of A or B," "A, B, or C," "at least one of A, B, and C," "at least one of A, B, or C," "one or a combination or two or more of A, B, and C," and the like may include any one of the items listed together in the corresponding one of the phrases, or all possible combinations thereof. Although terms such as first, second, and the like are used to describe various components, the components are not limited to the terms. These terms should be used only to distinguish one component from another component. For example, a "first" component may be referred to as a "second" component, and similarly, the "second" component may also be referred to as the "first" component.

It should be noted that when one component is described as being "connected," "coupled," or "joined" to another component, the first component may be directly connected, coupled, or joined to the second component, or a third component may be "connected," "coupled," or "joined" between the first and second components.

The singular forms "a," "an," and "the" are intended to include the plural forms as well, unless the context clearly indicates otherwise. It will be further understood that the terms "comprises/comprising" and/or "includes/including," when used herein, specify the presence of stated features, integers, steps, operations, elements, and/or components, but do not preclude the presence or addition of one or more other features, integers, steps, operations, elements, components and/or groups thereof.

Unless otherwise defined, all terms used herein including technical and scientific terms have the same meanings as those commonly understood by one of ordinary skill in the art to which this disclosure pertains. Terms such as those defined in commonly used dictionaries are to be interpreted as having a meaning that is consistent with their meaning in the context of the relevant art and are not to be interpreted in an idealized or overly formal sense unless expressly so defined herein.

Hereinafter, the examples are described in detail with reference to the accompanying drawings. When describing the examples with reference to the accompanying drawings, like reference numerals refer to like components and a repeated description related thereto is omitted.

FIG. 1 is a diagram illustrating a structure of an electronic device according to an embodiment.

Referring to FIG. 1, to manage a network device, an electronic device may include a physical layer 110, a data obtaining and device control layer 120, a digital twin layer 130, and an application layer 140. Each of the layers 110, 120, 130, and 140 of the electronic device may be implemented as separate components in the electronic device, but embodiments are not limited thereto. The layers 110, 120, 130, and 140 may be implemented by one or more components (e.g., a processor) of the electronic device. In addition, the layers 110, 120, 130, and 140 of the electronic device shown in FIG. 1 and operations of each layer are examples for the purpose of description, and embodiments are not limited thereto. An embodiment may be implemented with some of the layers 110, 120, 130, and 140 omitted or other layers added, or may be implemented with some of the operations of each layer omitted or other operations added.

The electronic device may be a device for managing a network device and may include various computing devices, such as a mobile phone, a smartphone, a tablet personal computer (PC), an e-book device, a laptop, a PC, a desktop, a workstation, or a server, various wearable devices, such as a smart watch, smart eyeglasses, a head-mounted display (HMD), or smart clothing, various home appliances such as a smart speaker, a smart television (TV), or a smart refrigerator, and other devices, such as a smart vehicle, a smart kiosk, an Internet of things (IoT) device, a walking assist device (WAD), a drone, or a robot, but examples are not limited thereto. In this specification, for ease of description, the electronic device may also be referred to as a digital twin network (DTN) system. Depending on an embodiment, the electronic device may be mounted on a network device or may be provided separately from a network device and communicate with the network device via a wired or wireless means. A network device may refer to a device that provides and manages a network.

The physical layer 110 may store data related to a network device. For example, the physical layer 110 may store network traffic information, device operation information, operation policy information, wireless information, and spatial information of the network device. The network traffic information may include, for example, data on a header and payload of network traffic. The device operation information may include, for example, data on a resource utilization status of network resources (e.g., a processor, a memory, and a storage space) and a log. The operation policy information may include, for example, a resource allocation status and routing information. The wireless information may include, for example, channel state information and information on a wireless signal. The spatial information may include, for example, temperature, humidity, illuminance, wind speed, and external media information (e.g., weather forecast and news information).

The data obtaining and device control layer 120 may obtain and analyze data related to the network device. For example, the data obtaining and device control layer 120 may obtain and analyze data of the physical layer 110. In addition, the data obtaining and device control layer 120 may take action in response to an abnormal situation occurring in the network device. For example, the data obtaining and device control layer 120 may control the network device according to a countermeasure determined by the electronic device.

The digital twin layer 130 may build a digital twin model. For example, the digital twin layer 130 may build a digital twin of the network device, traffic information, and spatial information of a place in which the network device is located. In addition, the digital twin layer 130 may generate, using the digital twin, a prediction model that predicts an abnormal situation of the network device. Furthermore, the digital twin layer 130 may provide a prediction result and a countermeasure through the prediction model. For example, the digital twin layer 130 may predict future traffic of the network device or a disaster situation by using the prediction model to provide a countermeasure for the situation. In addition, the digital twin layer 130 may take action for each situation. For example, the digital twin layer 130 may determine a countermeasure for the abnormal situation of the network device.

The digital twin may represent a digital representation of an object of interest. In other words, the digital twin may represent a digital representation of real-world physical objects implemented in a virtual world or metaverse. For example, the digital twin may represent a representation of a physical asset in a digital world. The digital twin may require different functions (e.g. synchronization, real-time support, and the like) depending on a specific field of application. In addition, the digital twin may serve as an interaction interface to link the virtual world with the real world, allowing a user to expand experiences beyond the limits of a virtual environment. The digital twin may be a digital representation of physical objects and part of the virtual world.

The application layer 140 may visualize obtained data or data predicted by the prediction model and output a notification for an abnormal situation. For example, the application layer 140 may visualize and output a predicted network status change, traffic trend, or abnormal situation. In addition, the application layer 140 may distribute traffic and perform operation optimization according to the predicted abnormal situation. Furthermore, the application layer 140 may predict the status of the network device and perform predictive maintenance on the network device.

According to an embodiment, the electronic device may build a digital twin of data related to the network device and train the prediction model based on the digital twin. In addition, the electronic device may predict, using a prediction model, a traffic trend and an abnormal situation, based on current traffic information, and provide a countermeasure for the abnormal situation, thereby efficiently managing network resources and ensuring a reaction to the abnormal situation. The operations of the electronic device for managing the network device are described in detail with reference to FIGS. 2 to 5 below.

Figure 2:
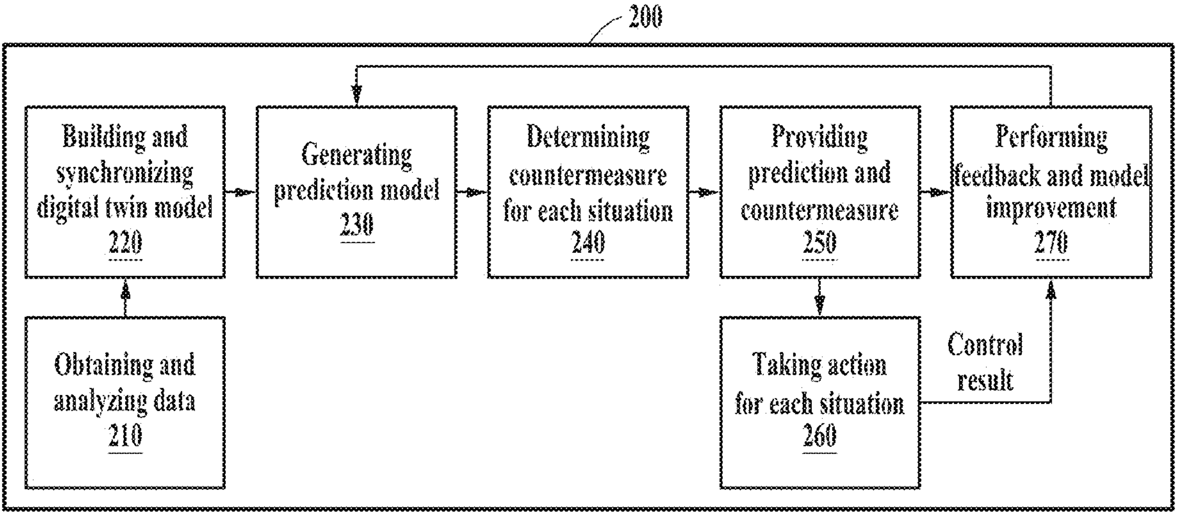
FIG. 2 is a diagram illustrating a training and inference process of a model of an electronic device, according to an embodiment.

FIG. 2 is a diagram illustrating a training and inference process of a model of an electronic device, according to an embodiment.

In the following embodiments, operations may be performed sequentially, but not necessarily. For example, the order of the operations may change, and at least two of the operations may be performed in parallel. Operations 210 to 260 may be performed by at least one component (e.g., a processor) of an electronic device 200.

In operation 210, the electronic device 200 may obtain and analyze data related to a network device. According to an embodiment, the electronic device 200 may obtain at least one of network traffic information, device operation information, operation policy information, wireless information, and spatial information.

In operation 220, the electronic device 200 may build a digital twin model of data related to the network device and synchronize the digital twin model with current data. According to an embodiment, the electronic device 200 may build a digital twin of at least one of device information, traffic information, device operation information, traffic information, wireless information, and spatial information, which are related to the network device. In addition, the electronic device 200 may synchronize a physical network with the digital twin. The electronic device 200 may build a digital twin that reflects, through synchronization, the component and a manner of operation of the physical network, and reproduce a network status by linking the built digital twin with real-time data. In an embodiment, the electronic device 200 may generate a virtual environment in which network performance and an abnormal situation are able to be simulated using the digital twin model, and set up a virtual simulation environment for virtually testing various scenarios.

In operation 230, the electronic device 200 may generate a prediction model that predicts an abnormal situation of the network device. According to an embodiment, the electronic device 200 may train a prediction model with a past traffic pattern and a failure occurrence pattern, based on a dataset, to predict a future network status. For example, the electronic device 200 may train the prediction model, based on network-related information, spatial information (e.g., temperature, humidity, illuminance, and wind speed), weather forecast information, and real-time news. The prediction model may be trained using a training method suitable for network requirements among time series prediction, machine learning, and a deep learning model. For example, long short-term memory (LSTM) and autoregressive integrated moving average (ARIMA) may be a training method suitable for traffic prediction in a time series-based network. In addition, the electronic device 200 may adjust hyperparameters for optimization during a training process of the prediction model to increase an accuracy and response speed of the prediction model.

In operation 240, the electronic device 200 may determine a countermeasure for each situation. In an embodiment, various situations may be modeled on the network device, such as a traffic surge, typhoon, and fire. In addition, an action plan such as protecting the network device or diverting traffic may be determined according to a response scenario for each situation model.

In operation 250, the electronic device 200 may predict a future status of the network device by using the prediction model and provide a countermeasure for the predicted future status. According to an embodiment, the electronic device 200 may reflect a network status change in real time through the digital twin and data streaming, and the trained prediction model may predict the future status in real time based on the network status change. The electronic device 200 may allow monitoring of a prediction result and a network status through a dashboard and a notification system. A network administrator may take immediate action, using a monitoring system of the electronic device 200.

In operation 260, the electronic device 200 may take action for each situation according to the countermeasure. For example, when the prediction model predicts an abnormal situation such as a determined problem or performance degradation, the electronic device 200 may provide a countermeasure for the abnormal situation. The network device may be optimized for the network status by taking action according to the countermeasure. For example, the electronic device 200 may perform a prediction-based optimization task, such as an automatic adjustment of resources in response to an expected increase in traffic or an advance checkup for a device having a possibility of failure.

In operation 270, the electronic device 200 may compare the prediction result with an actual network status to perform feedback and model improvement. According to an embodiment, the electronic device 200 may evaluate an accuracy of the prediction model by comparing actual data (e.g., the actual network status) with the prediction result. The electronic device 200 may generate a prediction model that may adapt to a change in a network condition by, based on the accuracy of the prediction model, retraining and optimizing the prediction model.

Figure 3:
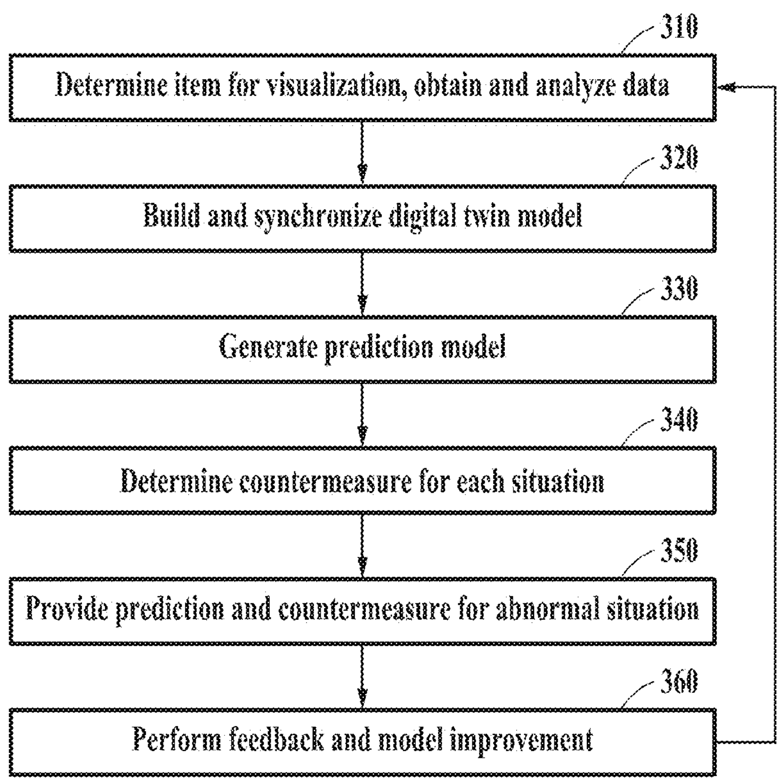
FIGS. 3 to 5 are flowcharts illustrating operations of each situation of an electronic device, according to an embodiment.
Figure 4:
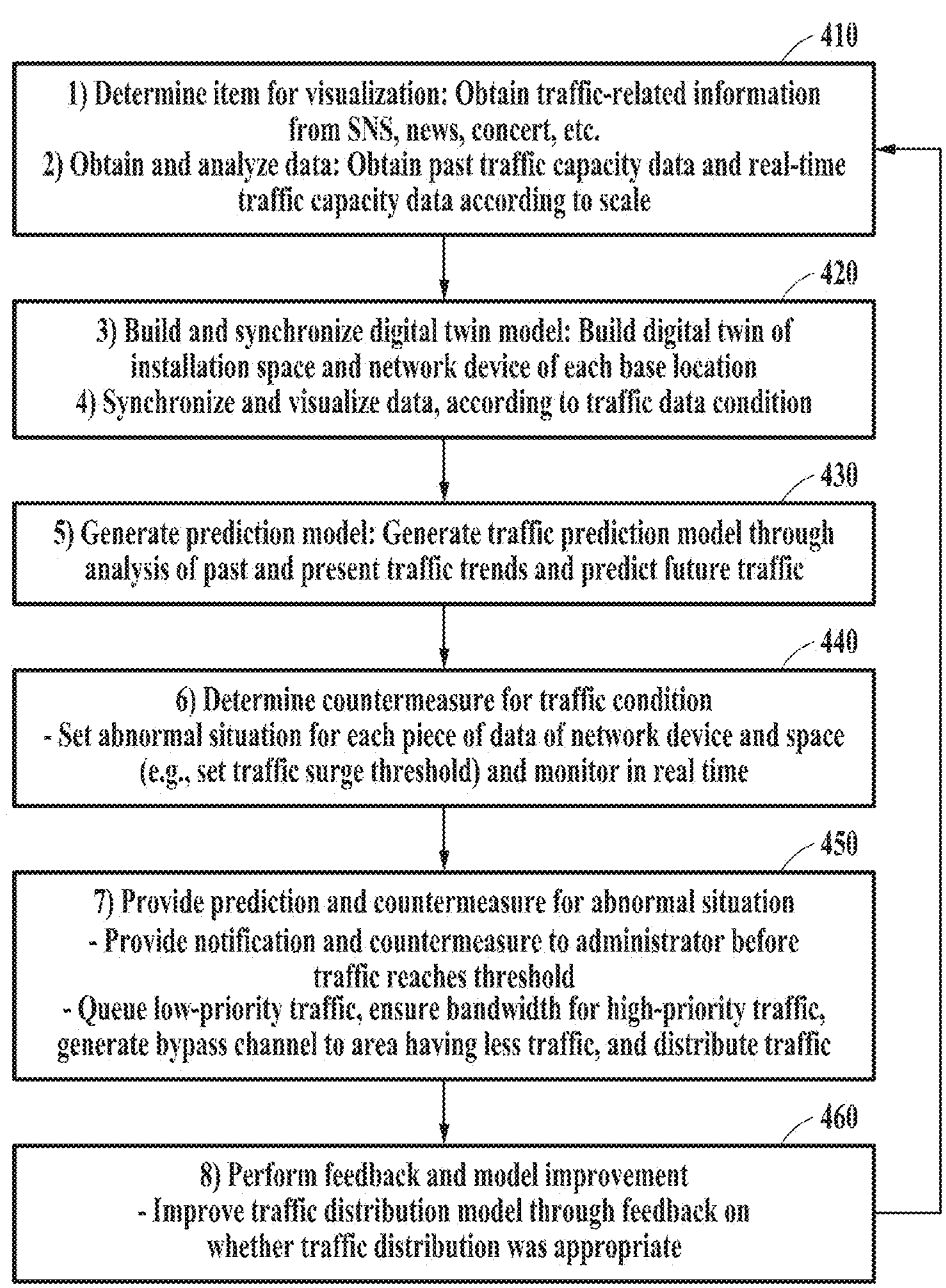
Figure 5:
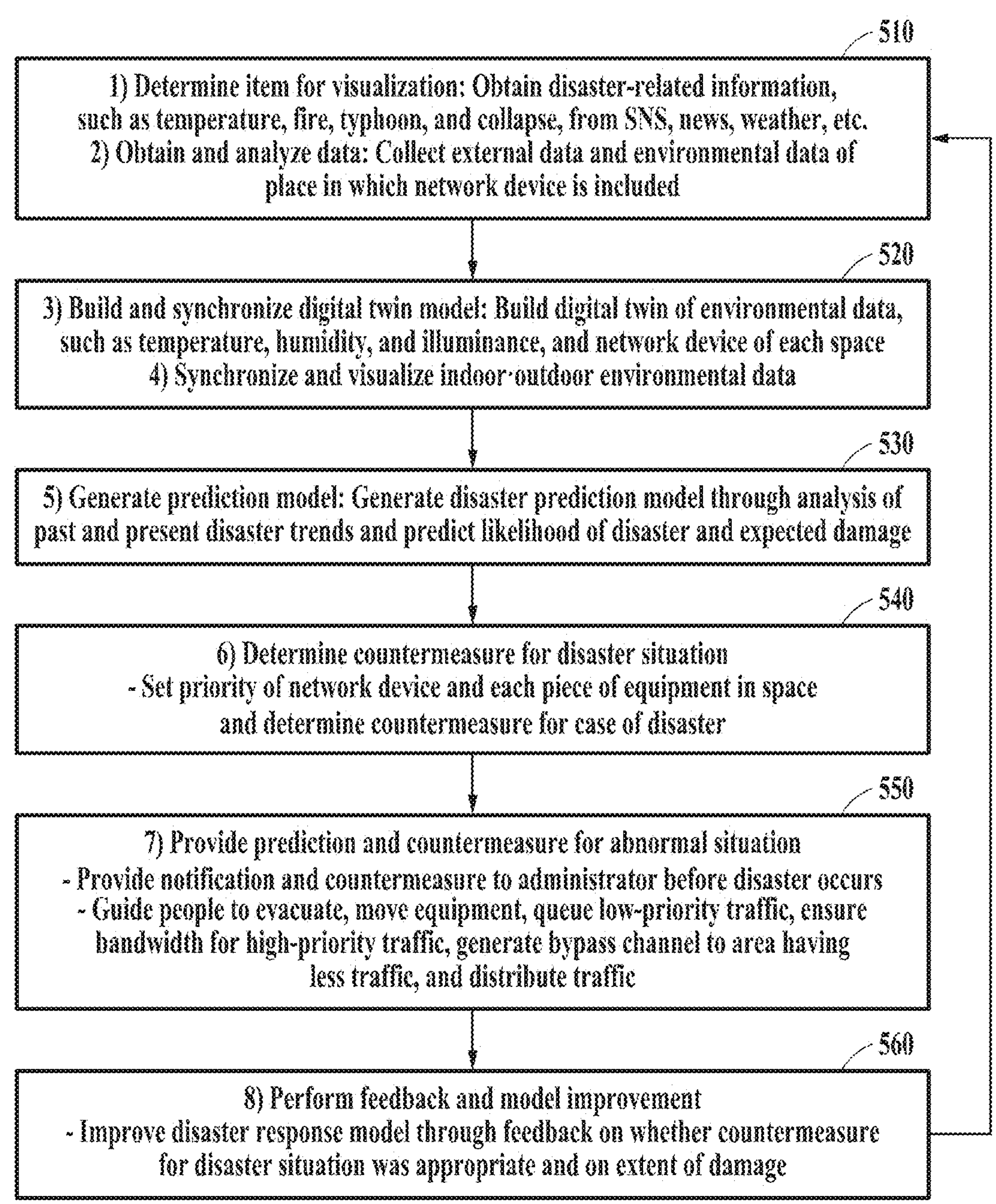

FIGS. 3 to 5 are flowcharts illustrating operations of each situation of an electronic device, according to an embodiment.

Referring to FIG. 3, operations 310 to 360 of an electronic device are illustrated, in which a prediction model is trained and a countermeasure for each situation is provided through the prediction model.

In operation 310, the electronic device may determine an item for visualization among information related to a network device and may obtain and analyze data related to the network device.

In operation 320, the electronic device may build a digital twin model and synchronize current data with the digital twin model.

In operation 330, the electronic device may generate a prediction model, based on the digital twin model.

In operation 340, the electronic device may determine a countermeasure for each situation.

In operation 350, the electronic device may determine a countermeasure for each abnormal situation predicted by the prediction model.

In operation 360, the electronic device may perform feedback and model improvement.

The operations 310 to 360 of the electronic device, performed in example situations, such as in a traffic surge and a disaster situation, are described in detail with reference to FIGS. 4 and 5 below.

Referring to FIG. 4, operations 410 to 460 of an electronic device are illustrated, which are performed in a traffic surge situation (e.g., a large concert in progress).

In operation 410, the electronic device may obtain relevant information such as news, an event (e.g., a concert), a social networking service (SNS), and the like as an item for visualization. The electronic device may obtain past traffic capacity data and real-time traffic capacity data according to scale.

In operation 420, the electronic device may build a digital twin of an installation space and a network device of each base location. In addition, the electronic device may synchronize and visualize data, according to a real-time traffic data condition.

In operation 430, the electronic device may generate a traffic prediction model through analysis of past and present traffic trends and predict future traffic through the traffic prediction model.

In operation 440, the electronic device may determine and monitor an abnormal situation for each piece of data of the network device and a space in which the network device is located. In an embodiment, the abnormal situation may include a case in which future traffic exceeds a predetermined threshold.

In operation 450, the electronic device may provide notification and a countermeasure to an administrator before traffic reaches a predetermined threshold. In addition, the electronic device may generate a bypass channel for a bandwidth of high-priority traffic in the network device and distribute the high-priority traffic to the bypass channel. For example, the electronic device may queue low-priority traffic and generate a bypass channel to an channel having less traffic to ensure a bandwidth for the high-priority traffic.

In operation 460, the electronic device may improve a traffic distribution model through feedback on whether the traffic distribution was appropriate. For example, the traffic distribution model may be improved by using edge computing and traffic offloading.

Referring to FIG. 5, operations 410 to 460 of an electronic device are illustrated, which are performed in a disaster situation.

In operation 510, the electronic device may obtain disaster-related information (e.g., temperature, fire, typhoon, and collapse) from an SNS, news, weather, and the like. The electronic device may obtain external data and environmental data (e.g., temperature, humidity, and illuminance) of a place in which a network device is included.

In operation 520, the electronic device may build a digital twin of the environmental data and a network device in each space. The electronic device may synchronize the environmental data with the digital twin and visualize the environmental data.

In operation 530, the electronic device may generate a disaster prediction model through analysis of past and present disaster trends. The electronic device may, using the disaster prediction model, predict whether a disaster situation might occur at the place in which the network device is located. For example, the electronic device may, using the disaster prediction model, predict a likelihood of a disaster and expected damage.

In operation 540, the electronic device may determine a priority of the network device and each piece of equipment in place in which the network device is located and may determine a countermeasure for the case of a disaster.

In operation 550, when a disaster is predicted to occur, the electronic device may output a notification before a disaster occurs and provide a countermeasure for the disaster situation. For example, the electronic device may provide a countermeasure such as guiding people to evacuate, moving equipment, distributing traffic, and the like. According to an embodiment, when the disaster situation is predicted to occur at the place in which the network device is located, the electronic device may generate a bypass channel for a bandwidth of high-priority traffic in the network device and distribute the high-priority traffic to the bypass channel.

In operation 560, the electronic device may improve an disaster response model through feedback on whether the countermeasure for the disaster situation was appropriate and on the extent of damage.

Figure 6:
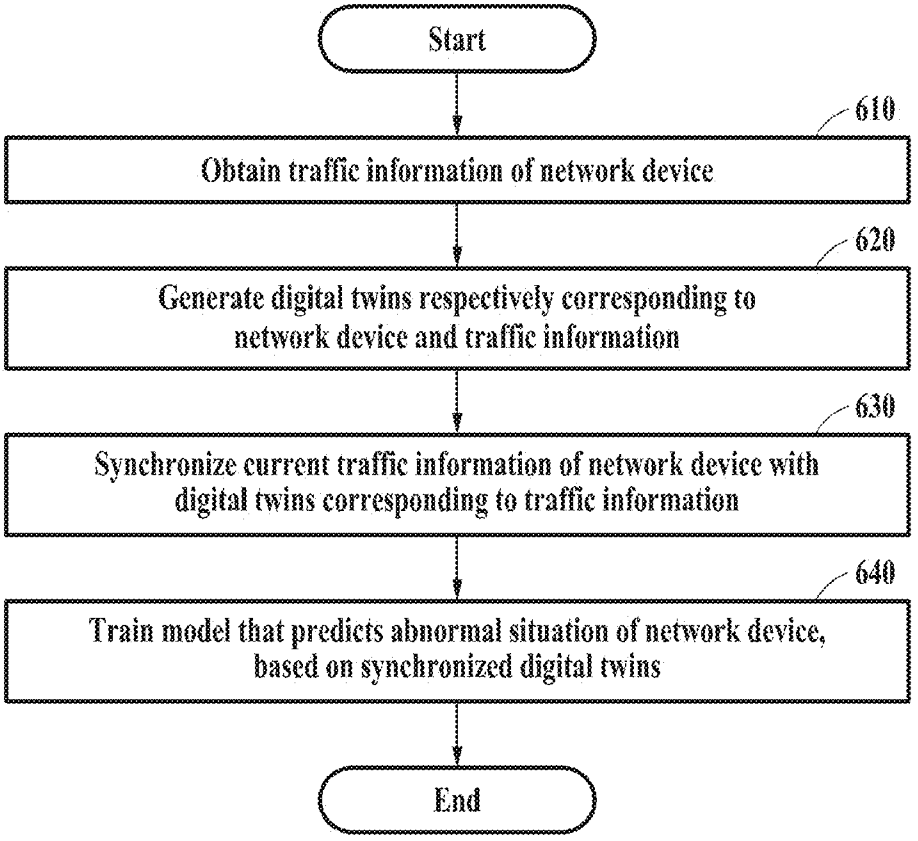
FIG. 6 is a flowchart illustrating an operating method of an electronic device for training of a model, according to an embodiment.

FIG. 6 is a flowchart illustrating an operating method of an electronic device for training of a model, according to an embodiment.

In the following embodiments, operations may be performed sequentially, but not necessarily. For example, the order of the operations may change, and at least two of the operations may be performed in parallel. Operations 610 to 640 may be performed by at least one component (e.g., a processor) of the electronic device.

In operation 610, the electronic device may obtain traffic information of a network device. The electronic device may obtain spatial information of a place in which the network device is located.

In operation 620, the electronic device may generate digital twins respectively corresponding to the network device and the traffic information. The electronic device may generate a digital twin corresponding to the spatial information.

In operation 630, the electronic device may synchronize current traffic information of the network device with the digital twins corresponding to the traffic information. The electronic device may synchronize current spatial information with the digital twin corresponding to the spatial information.

In operation 640, the electronic device may train a model that predicts an abnormal situation of the network device, based on the synchronized digital twins. The electronic device may train the model by further utilizing the synchronized spatial information. The electronic device may train the model based on a past traffic pattern and an abnormal situation occurrence pattern of the network device.

The spatial information may include environment information of the place in which the network device is located. The traffic information may include at least one of operation information, operation policy information, and external media information, which are related to the network device.

As the description above with reference to FIGS. 1 to 5 may apply to each of the operations shown in FIG. 6, a more detailed description thereof is omitted.

Figure 7:
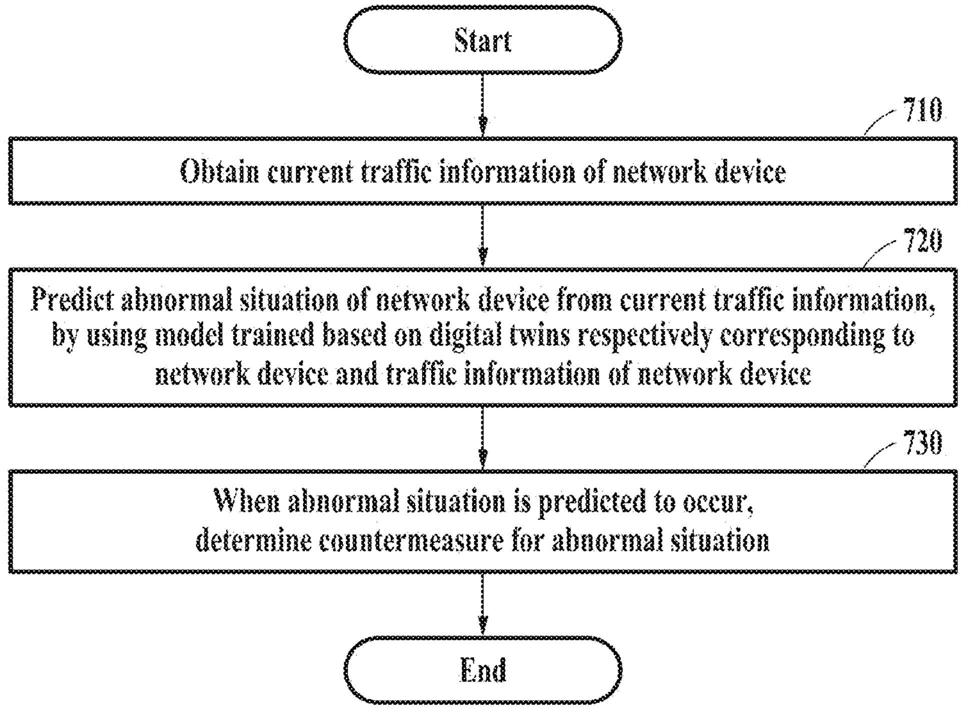
FIG. 7 is a flowchart illustrating an operating method of an electronic device for inference of a model, according to an embodiment.

FIG. 7 is a flowchart illustrating an operating method of an electronic device for inference of a model, according to an embodiment.

In the following embodiments, operations may be performed sequentially, but not necessarily. For example, the order of the operations may change, and at least two of the operations may be performed in parallel. Operations 710 to 730 may be performed by at least one component (e.g., a processor) of the electronic device.

In operation 710, the electronic device may obtain current traffic information of the network device.

In operation 720, the electronic device may predict an abnormal situation of the network device from the current traffic information, by using a model based on digital twins respectively corresponding to the network device and traffic information of the network device. The electronic device may, using the model, predict future traffic of the network device. The electronic device may determine whether the future traffic exceeds a predetermined threshold. The electronic device may, using the model, predict whether a disaster situation might occur at a place in which the network device is located. The electronic device may output a network status change of the network device that is predicted by the model.

In operation 730, when an abnormal situation is predicted to occur, the electronic device may determine a countermeasure for the abnormal situation. When the future traffic exceeds a predetermined threshold, the electronic device may generate a bypass channel for a bandwidth of high-priority traffic in the network device and distribute the high-priority traffic to the bypass channel. When the disaster situation is predicted to occur at the place in which the network device is located, the electronic device may generate a bypass channel for a bandwidth of high-priority traffic in the network device and distribute the high-priority traffic to the bypass channel. When the disaster situation is predicted to occur at the place in which the network device is located, the electronic device may output an evacuation notification to people that are at the place and/or a relocation notification of the network device.

As the description above with reference to FIGS. 1 to 6 may apply to each of the operations shown in FIG. 12, a more detailed description thereof is omitted.

Figure 8:
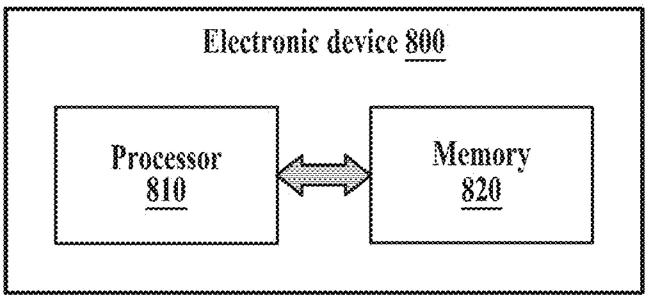
FIG. 8 is a block diagram illustrating an electronic device according to an embodiment.

FIG. 8 is a block diagram illustrating an electronic device according to an embodiment. Referring to FIG. 8, an electronic device 800 may include a processor 810. The processor 810 may include at least one processor. The electronic device 800 may further include a memory 820.

The memory 820 may store instructions (or programs) executable by the processor 810. For example, the instructions may include instructions for executing an operation of the processor 810 and/or an operation of each component of the processor 810.

The processor 810 may be a device that executes instructions or programs or controls the electronic device 800 and may include, for example, various processors such as a central processing unit (CPU) and a graphics processing unit (GPU). The processor 810 may obtain traffic information of a network device. The processor 810 may generate digital twins respectively corresponding to the network device and the traffic information. The processor 810 may synchronize current traffic information of the network device with the digital twins corresponding to the traffic information. The processor 810 may train a model that predicts an abnormal situation of the network device, based on the synchronized digital twins.

The processor 810 may obtain spatial information of the place in which the network device is located, generate a digital twin corresponding to the spatial information, synchronize current spatial information with the digital twin corresponding to the spatial information, and train the model by further utilizing the synchronized spatial information. The processor 810 may train the model based on a past traffic pattern and an abnormal situation occurrence pattern of the network device.

The processor 810 may obtain current traffic information of the network device. The processor 810 may predict an abnormal situation of the network device from the current traffic information, by using the model trained based on the digital twins respectively corresponding to the network device and the traffic information of the network device. When the abnormal situation is predicted to occur, the processor 810 may determine a countermeasure for the abnormal situation.

The processor 810 may predict future traffic of the network device by using the model and determine whether the future traffic exceeds a predetermined threshold. When the future traffic exceeds a predetermined threshold, the processor 810 may generate a bypass channel for a bandwidth of high-priority traffic in the network device and distribute the high-priority traffic to the bypass channel. The processor 810 may, using the model, predict whether a disaster situation might occur at a place in which the network device is located. When the disaster situation is predicted to occur at the place in which the network device is located, the processor 810 may generate a bypass channel for a bandwidth of high-priority traffic in the network device and distribute the high-priority traffic to the bypass channel. When the disaster situation is predicted to occur at the place in which the network device is located, the processor 810 may output an evacuation notification to people that are at the place and/or a relocation notification of the network device. The processor 810 may output a network status change of the network device that is predicted by the model.

In addition, the electronic device 800 may process the operations described above.

The examples described herein may be implemented using hardware components, software components, and/or combinations thereof. A processing device may be implemented using one or more general-purpose or special-purpose computers, such as, for example, a processor, a controller, an arithmetic logic unit (ALU), a digital signal processor (DSP), a microcomputer, an FPGA, a programmable logic unit (PLU), a microprocessor or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is used as singular. However, one of ordinary skill in the art will appreciate that a processing device may include multiple processing elements and/or multiple types of processing elements. For example, a processing device may include a plurality of processors, or a single processor and a single controller. In addition, a different processing configuration is possible, such as one including parallel processors.

The software may include a computer program, a piece of code, an instruction, or some combination thereof, to independently or collectively instruct or configure the processing device to operate as desired. The software and/or data may be stored in any type of machine, component, physical or virtual equipment, computer storage medium, or device for the purpose of being interpreted by the processing device or providing instructions or data to the processing device. The software may also be distributed over network-coupled computer systems so that the software is stored and executed in a distributed fashion. The software and data may be stored in a non-transitory computer-readable recording medium.

The methods according to the above-described examples may be recorded in non-transitory computer-readable media including program instructions to implement various operations of the above-described examples. The media may also include the program instructions, data files, data structures, and the like alone or in combination. The program instructions recorded on the media may be those specially designed and constructed for the examples, or they may be of the kind well-known and available to those having skill in the computer software arts. Examples of non-transitory computer-readable media include magnetic media such as hard disks, floppy disks, and magnetic tape; optical media such as compact disc read-only memory (CD-ROM) and a digital versatile disc (DVD); magneto-optical media such as floptical disks; and hardware devices that are specially configured to store and perform program instructions, such as read-only memory (ROM), RAM, flash memory, and the like. Examples of program instructions include both machine code, such as those produced by a compiler, and files containing higher-level code that may be executed by the computer using an interpreter.

The above-described hardware devices may be configured to act as one or more software modules in order to perform the operations of the above-described embodiments, or vice versa.

Although the examples have been described with reference to the limited number of drawings, it will be apparent to one of ordinary skill in the art that various technical modifications and variations may be made in the examples without departing from the spirit and scope of the claims and their equivalents. For example, suitable results may be achieved if the described techniques are performed in a different order, and/or if components in a described system, architecture, device, or circuit are combined in a different manner and/or replaced or supplemented by other components or their equivalents.

Therefore, other implementations, other examples, and equivalents to the claims are also within the scope of the following claims.

What is claimed is:

1. An electronic device comprising:

a processor; and a memory configured to store instructions, wherein the instructions, when executed by the processor, cause the electronic device to:

obtain traffic information of a network device;

generate digital twins respectively corresponding to the network device and the traffic information;

synchronize current traffic information of the network device with the digital twins corresponding to the traffic information; and train a model that is configured to predict an abnormal situation of the network device, based on the synchronized digital twins.

2. The electronic device of claim 1, wherein the instructions, when executed by the processor, cause the electronic device to:

obtain spatial information of a place in which the network device is located;

generate a digital twin corresponding to the spatial information;

synchronize current spatial information with the digital twin corresponding to the spatial information; and train the model by further utilizing the synchronized spatial information.

3. The electronic device of claim 1, wherein the instructions, when executed by the processor, cause the electronic device to:

train the model based on a past traffic pattern and an abnormal situation occurrence pattern of the network device.

4. The electronic device of claim 2, wherein the spatial information comprises:

environment information of the place in which the network device is located.

5. The electronic device of claim 1, wherein the traffic information comprises:

at least one of operation information, operation policy information, and external media information of the network device.

6. An electronic device comprising:

a processor; and a memory configured to store instructions, wherein the instructions, when executed by the processor, cause the electronic device to:

obtain current traffic information of a network device;

predict an abnormal situation of the network device from the current traffic information, through a model based on digital twins respectively corresponding to the network device and traffic information of the network device; and when the abnormal situation is predicted to occur, determine a countermeasure for the abnormal situation.

7. The electronic device of claim 6, wherein the instructions, when executed by the processor, cause the electronic device to:

predict future traffic of the network device through the model; and determine whether the future traffic exceeds a predetermined threshold.

8. The electronic device of claim 7, wherein the instructions, when executed by the processor, cause the electronic device to:

when the future traffic exceeds the predetermined threshold, generate a bypass channel for a bandwidth of high-priority traffic; and distribute the high-priority traffic to the bypass channel.

9. The electronic device of claim 6, wherein the instructions, when executed by the processor, cause the electronic device to:

predict, using the model, whether a disaster situation is to occur at a place in which the network device is located.

10. The electronic device of claim 9, wherein the instructions, when executed by the processor, cause the electronic device to:

when the disaster situation is predicted to occur at the place in which the network device is located, generate a bypass channel for a bandwidth of high-priority traffic in the network device; and distribute the high-priority traffic to the bypass channel.

11. The electronic device of claim 9, wherein the instructions, when executed by the processor, cause the electronic device to:

when the disaster situation is predicted to occur at the place in which the network device is located, output an evacuation notification to people that are at the place and/or a relocation notification of the network device.

12. The electronic device of claim 6, wherein the instructions, when executed by the processor, cause the electronic device to:

output a network status change of the network device that is predicted by the model.

13. An operating method of an electronic device, the operating method comprising:

obtaining current traffic information of a network device;

predicting an abnormal situation of the network device from the current traffic information, through a model based on digital twins respectively corresponding to the network device and traffic information of the network device; and when the abnormal situation is predicted to occur, determining a countermeasure for the abnormal situation.

14. The operating method of claim 13, wherein the predicting of the abnormal situation of the network device comprises:

predicting future traffic of the network device through the model; and determining whether the future traffic exceeds a predetermined threshold.

15. The operating method of claim 14, wherein the determining of a countermeasure for the abnormal situation comprises:

when the future traffic exceeds the predetermined threshold, generating a bypass channel for a bandwidth of high-priority traffic; and distributing the high-priority traffic to the bypass channel.

16. The operating method of claim 13, wherein the predicting of the abnormal situation of the network device comprises:

predicting, using the model, whether a disaster situation is to occur at a place in which the network device is located.

17. The operating method of claim 16, wherein the determining of a countermeasure for the abnormal situation comprises:

when the disaster situation is predicted to occur at the place in which the network device is located, generating a bypass channel for a bandwidth of high-priority traffic in the network device; and distributing the high-priority traffic to the bypass channel.

18. The operating method of claim 16, wherein the determining of a countermeasure for the abnormal situation comprises:

when the disaster situation is predicted to occur at the place in which the network device is located, outputting an evacuation notification to people that are at the place and/or a relocation notification of the network device.

19. The operating method of claim 13, wherein the predicting of the abnormal situation of the network device comprises:

outputting a network status change of the network device that is predicted by the model.

20. A non-transitory computer-readable storage medium storing instructions that, when executed by a processor, cause the processor to perform the operating method of claim 13.

* * * * *